United States Patent [19]

Munday

[11] 4,442,527

[45] Apr. 10, 1984

[54] SYNCHRONIZATION SYSTEMS

[75] Inventor: Peter J. Munday, Reading, England

[73] Assignee: Racal Research Limited, Bracknell, England

[21] Appl. No.: 332,192

[22] Filed: Dec. 18, 1981

[30] Foreign Application Priority Data

Jun. 24, 1981 [GB] United Kingdom ................. 8119492

[51] Int. Cl.³ ............................................. H04L 7/00
[52] U.S. Cl. ...................................... 375/1; 375/115;
455/29; 455/30; 455/71
[58] Field of Search ...................... 375/1, 2.1, 2.2, 106,
375/111, 115; 455/29, 30, 32, 62, 63, 65, 71;
370/100, 107

[56] References Cited

U.S. PATENT DOCUMENTS

4,193,030  3/1980  Rabow ..................................... 375/1
4,267,592  5/1981  Craiglow ................................ 375/1
4,349,915  9/1982  Costas .................................. 455/65

Primary Examiner—Benedict V. Safourek
Attorney, Agent, or Firm—Leydig, Voit, Osann, Mayer & Holt, Ltd.

[57] ABSTRACT

A syncrhonization arrangement is disclosed for synchronizing a receiver with a transmitter whose frequency is hopping through a sequence of predetermined frequencies arranged pseudo-randomly. The transmitter includes a time base circuit in the form of a string of dividers operated from a stable oscillator. One divider produces (in this example) a 28 bit synchronization signal which changes state once every sixty four hop frequencies. The 28 bits control a keystream generator which produces a pseudo-random output sequence controlling the transmitting frequencies. This 28 bit signal is formatted by repeating it several times successively, with its bits partially re-circulated to a predetermined extent each time, masking bits are added, and the result transmitted to the receiver on one of the hop frequencies. At the receiver, a correlator subtracts the mask, partially re-circulates the bits to offset the partial recirculation at the transmitter, and recognizes receipt of the 28 bits when successive groups of the resultant bits are identical (or do not differ by more than predetermined total error). The 28 bits are used to pre-set a divider at the receiver which then in turn resets the receiver's keystream generator, thereby synchronizing the receiver.

16 Claims, 4 Drawing Figures

SYNCHRONIZATION SYSTEMS

BACKGROUND OF THE INVENTION

The invention relates to electrical synchronising circuits, and more specifically to such synchronising circuits used to synchronise the operation of a radio transmitter and one or more radio receivers. In the embodiment of the invention to be described, the transmitter is arranged to change its operating frequency very rapidly (to "hop") and the synchronising circuit to be described synchronises the operation of the receiver with the transmitter so that the receiver can receive the transmissions on the different frequencies.

BRIEF SUMMARY OF THE INVENTION

According to the present invention, there is provided a radio transmitting and receiving system, comprising a radio transmitter, transmitter control means operative to control the transmitter so that it transmits successively at each one in a predetermined sequence of different transmitting frequencies each of which is held for a predetermined transmitting period, a radio receiver, receiver control means operative to control the receiver so that it receives successively at each of the frequencies in the said sequence, and synchronisation means operative to synchronise the transmitter control means and the receiver control means by means of the provision of timing information which tends to make the receiver frequency at any time the same as the transmitter frequency, the synchronisation means comprising formatting means at the transmitter for producing, and transmitting to the receiver, a synchronisation signal whose value represents part of the timing information and whose time of occurrence represents another part of the timing information, and sync receiving means at the receiver for extracting the value of the synchronisation signal and its time of occurrence.

According to the present invention, there is also provided a radio transmitting and receiving network arranged to hop at a predetermined rate through a predetermined range of frequency channels and remaining on each channel for a predetermined length of time, comprising a plurality of radio transmitting/receiving means, each comprising frequency control means operative to control the transmitting/receiving frequency, pseudo-random sequence generating means operative to control the frequency control means to set the frequency to each one in a pseudo-random sequence of frequencies, a timing arrangement operative to control the timing of the pseudo-random sequence generating means, and synchronisation means for synchronising the timing arrangement in accordance with synchronisation data received from the other radio transmitting/receiving means; each timing arrangement comprising a stable frequency source and a cascaded chain of frequency counting means; each synchronising means comprising sync transmitting means responsive to the count value of the final counting means in the chain and operative when activated by the respective pseudo-random sequence generating means to cause the digits of the said count value to be transmitted by the transmitter/receiver on a predetermined channel and at a predetermined digital rate of transmission determined by another one of the counting means and starting and finishing at times determined by a further one of the counting means, and sync receiving means operative to receive the digits of the transmitted count value and to preset the final counting means in dependence on the received count value and to pre-set the other and further counting means respectively in dependence on the rate of receipt of the digits and on the time of receipt of the count value.

DESCRIPTION OF THE DRAWINGS

A radio communications system employing a radio transmitter, a radio receiver, and a synchronising circuit embodying the invention, will now be described, by way of example only, with reference to the accompanying diagrammatic drawings in which.

DESCRIPTION OF PREFERRED EMBODIMENTS

The system to be described comprises a number of radio transmitter/receivers, that is, each can operate as a transmitter and as a receiver. For simplicity of description, it will be assumed that there are two such units, one acting as a transmitter and the other as the receiver—though in practice a system may comprise more than two such units and each may be acting either as a transmitter and as a receiver.

Figure 1:
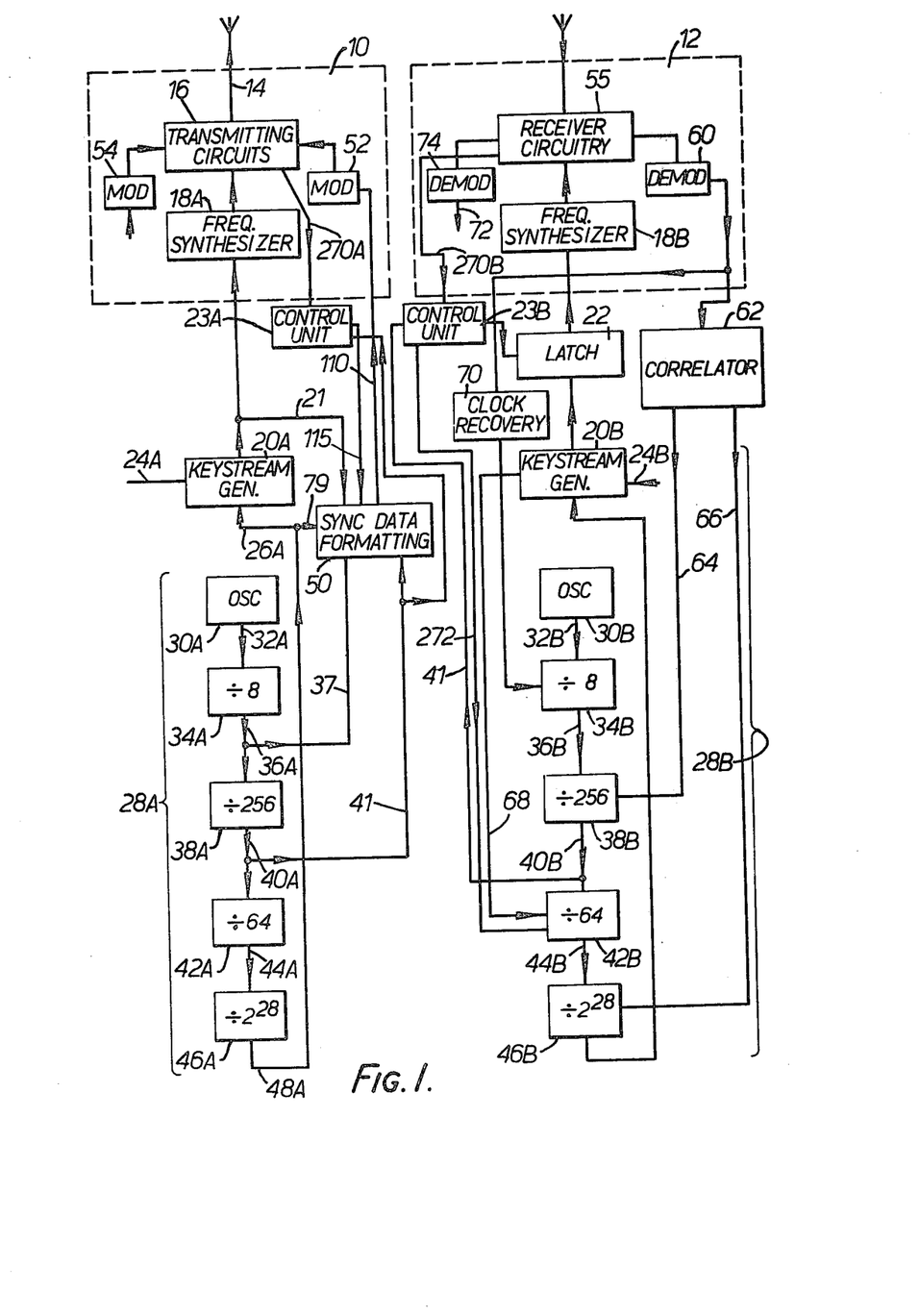
FIG. 1 is a block circuit diagram of a simplified form of the system.

FIG. 1 shows the unit 10 acting as the transmitter and the unit 12 acting as the receiver. The transmitter 10 has a transmitting aerial 14 driven by normal transmitting circuitry (shown by a block 16) under control of a frequency synthesizer 18A which determines the transmitting frequency. The frequency synthesizer 18A is in turn controlled by a keystream generator 20A. The keystream generator 20A generates a sequence of control signals each of which switches the transmitter to transmit on a different frequency, the frequency values being arranged pseudo-randomly.

The keystream generator 20A is controlled by two inputs: the first of these is the "key of the day" which is an 80-bit signal fed in manually on a line 24A, and the second is a 28-bit timing signal fed in on a line 26A.

The timing signal on line 26A is generated by a time base circuit indicated generally at 28A. The timing circuit comprises a crystal-controlled oscillator 30A producing an output on a line 32A at 102.4 kHz. This is fed through a divide-by-8 divider 34A which therefore produces an output on a line 36A at 12.8 kHz. This in turn is fed through a divide-by-256 divider 38A to produce an output on a line 40A having a period of 20 ms. This is divided by a divide-by-64 divider 42A which therefore produces an output on a line 44A having a period of 1280 ms. Finally, this is divided by a divide-by-$2^{28}$ divider 46A in the form of an 28-bit counter producing an 28-bit count output on a line 48A. This 28-bit output is referred to as the "time of day" ("TOD") output and therefore changes in value once every 1280 ms, reverting to its initial count after $2^{28} \times 1280$ ms, or 3976 days and 19.72 hours. The TOD signal on line 48A is fed to line 26A, to control the keystream generator 20A, and also to a sync data formatting unit 50 which (in a manner to be explained) formats the TOD signal and uses the formatted TOD signal to control a modulator 52 which in turn correspondingly modulates the transmitted signal on line 14.

The formatting unit 50 is also responsive to outputs on lines 37 and 41 from the dividers 34A and 38A and to an output on line 21 from the keystream generator. In a manner to be explained in more detail, therefore, the formatting unit 50 so controls the modulator 52 that synchronisation signals representing the state of synchronisation of the transmitter are transmitted to the receiver.

The transmitter also has modulating circuits indicated generally at 54 by means of which information (e.g. speech or data) can be transmitted.

The receiver 12 has receiving circuitry 55 whose operating frequency is controlled by a frequency synthesizer 18B. Other items at the receiver 12 corresponding to items at the transmitter are correspondingly referenced, except for the use of a suffix "B" instead of a suffix "A".

The receiver also has a latch 22 controlled by a control unit 23B. Normally, the latch is "transparent", that is, it responds to each output of the keystream generator 20B and passes on that output to the synthesizer 18B. When controlled by the control unit 23B, however, in a manner to be described and for providing an extra synchronisation function in certain circumstances, the latch can be held so that it does not pass every output of the keystream generator 20B to the synthesizer.

The transmitter has a control unit 23A which modifies the operation of the sync data formatting unit 50, in a manner to be described, to provide the extra synchronisation referred to.

The receiver includes a demodulator 60 which extracts the synchronisation signal transmitted by the transmitter 10. In a manner to be explained, signals are processed by a correlator 62 which produces synchronising outputs on lines 64 and 66 which pre-set the dividers 38B and 46B so that they are in phase with the corresponding dividers at the transmitter. In addition a clock recovery circuit 70 processes the extracted synchronisation signal and pre-sets divider 34B to be in phase with divider 34A. Divider 42B is pre-set by an output on a line 68 from the keystream generator 20B.

In this way, the time base circuitry and the keystream generator 20B at the receiver are kept in synchronism with the corresponding components at the transmitter. Assuming, therefore, that the keystream generator 20B receives the same "key of the day" input on its line 24B, it will so control the frequency synthesizer 18B that the receiver frequency at any time will be the same as the transmitter frequency and the receiver will therefore be able to receive the information (speech or data) being transmitted by the transmitter, this information being output on a line 72 from demodulator circuitry 74.

In the example being considered, the keystream generator 20A so controls the transmitter 10 as to change its operating frequency fifty times per second, that is, it has a hop rate of fifty hops per second. Therefore, each hop period (that is, the period for which the transmitter remains at each hop frequency, including the finite time for the transmitter to be set to that frequency) is 20 ms. Sixty four consecutive hop periods are defined as making up one "hop frame" which therefore has a length of 1280 ms. In the particular example being considered, the bandwidth within which the transmitting frequencies lie is 6.4 MHz comprising 256 adjacent 25 kHz channels.

In normal operation of the system, four of the 256 channels are used for sending synchronisation signals; that is, for most of the 20 ms hop period for which the system remains at each of these four frequencies, synchronisation signals are transmitted. The positions of the sync channels are determined by the keystream generator and they are not, therefore, regularly spaced among the 256 channels. In normal operation, a synchronisation signal will be transmitted once in every frame of 64 hop periods. In each hop frame, the keystream generators 20A and 20B produce output control signals which define conditions for the next hop frame. First, they produce a control signal defining the particular hop period during the hop frame in which synchronisation signals are to be sent and defining which particular one of the predetermined sync channel frequencies is to be used. The next control signal defines the particular frequency to be used during the first hop period of the hop frame, the third control signal defines the particular frequency to be used during the second hop period of the hop frame, and so on for the remaining hop periods (except that, of course, the frequency for the hop period during which synchronisation signals are to be transmitted has already been defined, by the first control signal).

However, as will be explained, the system can also operate in a different mode in which synchronisation signals are sent more frequently.

The operation of the system will now be described in more detail, first with particular reference to FIG. 2 which shows the sync data formatting unit 50 of FIG. 1.

As shown, the unit 50 receives the 28-bit TOD input on line 79 (from the TOD counter 46A, FIG. 1) in parallel and this is fed into an input unit 80 where three control bits and one parity bit are added to it, making a total of 32 bits, and these 32 bits are then output in serial form on a line 81 into each of seven 32-bit registers 82, 84, 86, 88, 90, 92 and 94 having their inputs connected in parallel.

The outputs of the seven shift registers are connected to respective inputs of a selector switch indicated diagrammatically at 96. Each of the registers 84 to 94 has a recirculating circuit indicated diagrammatically at 84A ... 94A which carries out a re-circulation or "rotation" of the bits in each register between its output and its input. That is, the bits in each of these registers are serially shifted through the register so that N of them pass from its output and are fed back into its input, N for each register being predetermined.

Selector switch 96 has an OFF position and seven ON positions in each of which it connects the output of a respective one of the seven registers 82 ... 94 to one input of a modulo-2 adder 104. The second input of adder 104 is fed from the output of a 224-bit register 106 which stores a 224-bit mask. The adder 104 adds each bit received via the selector switch 96 with a respective one of the bits of the mask, in a manner to be explained in more detail below.

Data is clocked out of the shift registers 82 ... 94 at the 12.8 kHz bit rate by means of clock signals received on line 37 from the divider 34A, see FIG. 1.

The output of the adder 104 is connected through an OR gate 108 to a line 110 which feeds the modulator 52 in the transmitter, see FIG. 1.

The second input of OR gate 108 can receive 26 bits pre-stored in a register 112, via a gate 114, these bits being fed out at the 12.8 kHz bit rate by means of signals received on line 37. Gate 114 is controlled by output line 21 from the keystream generator 20A (see FIG. 1) and also by the output on line 41 from the divider 38A

(FIG. 1) at the hop rate. Gate 114 is also controlled by a line 115 from the control unit 23A (see FIG. 1) but this will be ignored for the present.

Selector switch 96 is controlled by a control unit 116 which is activated by a signal on a line 118 when a counter 120 detects that all 26 bits from the register 112 have been fed out. When activated by the signal on line 118, control unit 116 switches selector switch 96 from the OFF position to its first ON position and also initiates a divide-by-32 divider 121 receiving the clock signals at the 12.8 kHz bit rate from line 37. Each time the divider 121 has received thirty two pulses at the 12.8 kHz bit rate, it produces an output on a line 122 which causes the selector switch 96 to shift to the next on position.

When thirty two such pulses have been received after the selector switch 96 has been set to the seventh ON position, it reverts to the OFF position.

The operation will now be described in more detail.

At the beginning of the sync hop period, a signal will be received on line 41 from the divider 38A (see FIG. 1) and gate 114 will open. The 26 pre-stored bits in register 112 will therefore be fed out, at the 12.8 kHz bit rate, on line 110.

When all 26 such bits have been output, counter 120 will activate control unit 116 and selector switch 96 will thus step to the first ON position. The 32 bits in shift register 82 will therefore be output serially, at the 12.8 kHz bit rate, and will be added, bit by bit, with the first 32 bits of the mask and the resultant modified 32 bits will be output serially on line 110.

Selector switch 96 will then be switched to the second ON position, in response to divider 121, and the 32 bits in register 84 will likewise be fed at the 12.8 kHz clock rate, added bit by bit to the next 32 bits of the mask, and output on line 110. This process continues until all 224 bits (7×32) in the registers 82 . . . 94 have been output. This condition will be detected by the control unit 116 which detects when 32 pulses at the 12.8 MHz rate have occurred after switch 96 has been set to its seventh position and opens a gate 126 allowing 6 pre-stored bits to be output from a register 128 at the 12.8 kHz bit rate under control of line 37, via gate 108.

Line 110 therefore carries a serial stream of 256 bits (26 bits from register 112, 224 bits from registers 82 . . . 94, and 6 bits from register 128). These bits occur at the 12.8 kHz bit rate and thus correspond exactly to one hop period (20 ms). The 256 bits on line 110 control the modulator 52 and are thus transmitted to the receiver.

The 26 initial bits, and the 6 final bits, are for timing purposes and to allow time for finite lags in the system (including time for the frequency synthesizer 18A to set the transmitter to the correct frequency). The important part of the message is of course the 224 intervening bits, referred to below as "the sync message". These 224 bits consists of the same 32 bits sent seven times: the first time, the bits are sent in their original order (but differ from the original 32 bits input on line 81 because the mask bits have been added); in each of the other six times, they are sent in the "rotated" form referred to above (that is, commencing not with bit No. 1 but with some other bit, depending on the value of N), and again modified by the mask bits.

When the receiver is unsynchronised, its keystream generator 20B searches the sync channels (of known frequency), looking for the sync message. In the particular example being considered, where there are four possible sync channel frequencies, the probability that the receiver will not be set to the correct frequency during one hop frame will be 0.75. Therefore, the probability that the receiver will not be set to the correct frequency once during n hop frames will be $(0.75)^n$. If n is 20, for example, the probability of not finding a sync message is approximately 0.0032, which is acceptably low.

Figure 3:
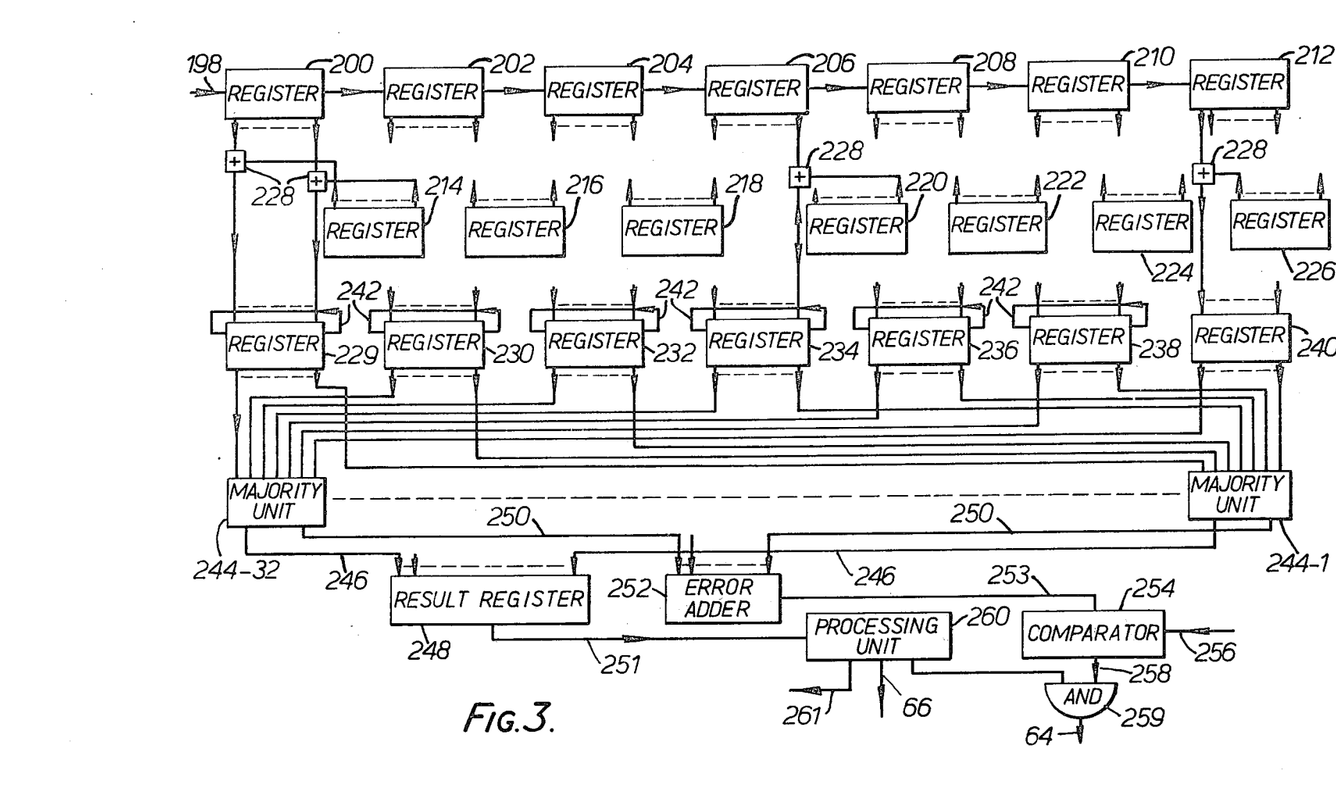
FIG. 3 is a block circuit diagram of a correlator in the unit.

The sync message is recognised at the receiver by means of the correlator 62, which will now be described in more detail with reference to FIG. 3.

The correlator 62 receives the bit stream from the demodulator 60 in the receiver (see FIG. 1) and this data is fed continuously by a line 198 into a chain of seven 32-bit shift registers 200, 202, 204, 206, 208, 210 and 212. Seven 32-bit registers 214, 216, 218, 220, 222, 224 and 226 store respective 32-bit parts of the same 224-bit mask as has already been referred to in the description of the sync data formatting unit 50 with respect to FIG. 2. 224 modulo-2 adders 228 (only some of which are shown) each carry out modulo-2 addition of a respective one of the bits in the registers 200 . . . 212 with the corresponding one of the mask bits in the registers 214 . . . 226, and the resultant output is stored in a respective one of the stages in seven 32-bit output registers 229, 230, 232, 234, 236, 238 and 240. Effectively, therefore, the registers 229 . . . 240 store the result obtained by subtracting the mask from the input data in the registers 200 . . . 212.

It will be appreciated that the foregoing process is carried out continuously.

Figure 2:
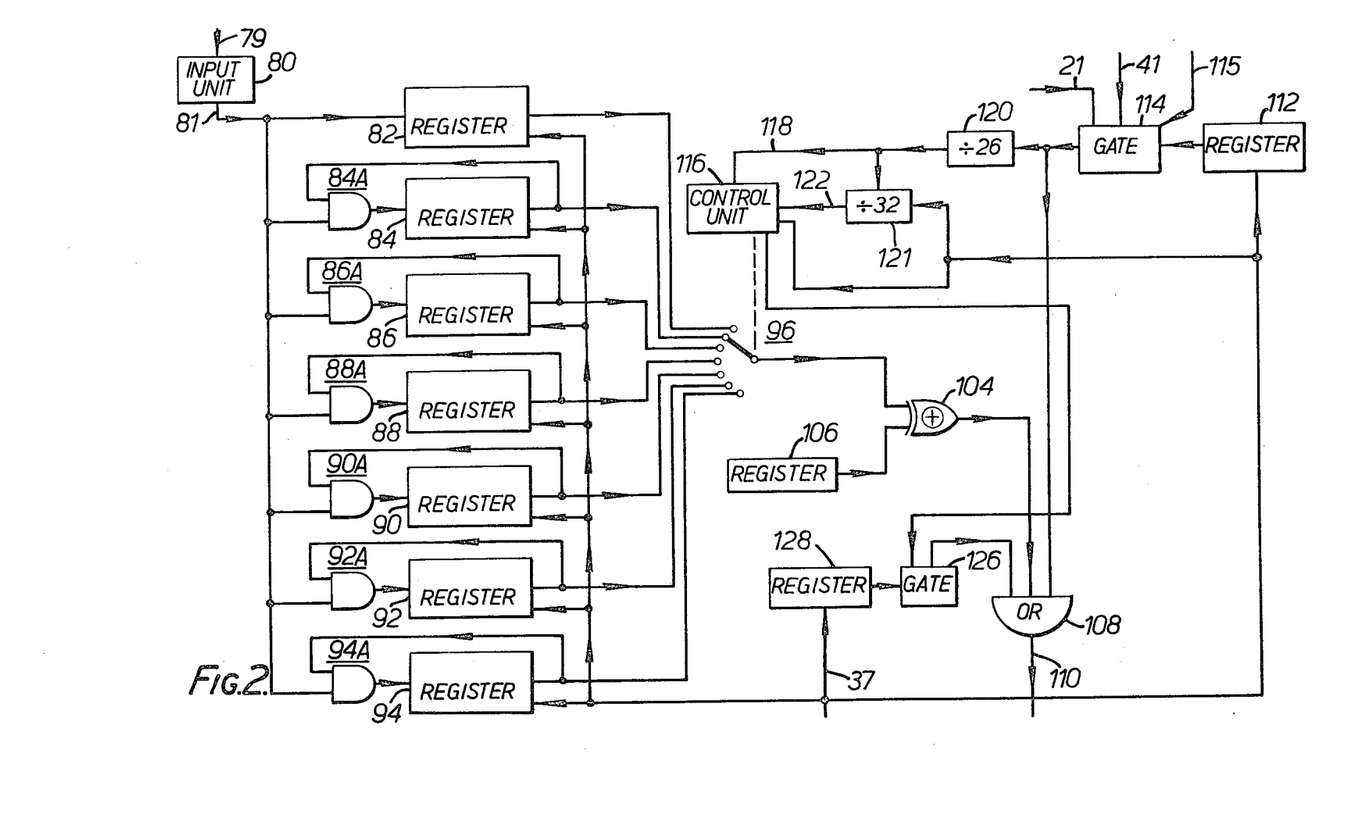
FIG. 2 is a block circuit diagram of a sync data formatting unit in the system.

The registers 229 . . . 238 have respective re-circulating circuits 242 corresponding to the recirculating circuits 84A . . . 94A of the shift registers 84 . . . 94 in the sync data formatting unit 50 of FIG. 2. The re-circulating circuits 242 carry out respective re-circulations of the bits in their respective registers, by respective numbers N which correspond with the numbers N used by the re-circulating circuits 84A . . . 94A of FIG. 2, but in the opposite sense. In other words, the re-circulating circuits 242 reverse the action of the re-circulating circuits of FIG. 2. Therefore, in the absence of any error and assuming that the input registers 200 . . . 212 contain the 224 bits of the sync message as transmitted from the transmitter, each of the seven output registers 229 . . . 240 should contain exactly the same 32 bits, each block of 32 bits being in the same order, that is, the order as originally output from unit 80 (see FIG. 2).

In fact, input line 198 continuously receives all the input data from the demodulator 60, and thus for most of the time the data bits in the register 200 . . . 212 will not be the 224 bits of the sync message and each of the output registers 229 . . . 240 will not store the same bits. The correlator therefore continuously checks the states of the registers 229 . . . 240 and recognises arrival of the sync message when the 32 bits in each register are either the same or do not differ by more than an acceptable error margin.

This process is carried out by thirty two majority-voting units which monitor the states of the output registers 229 . . . 240. FIG. 3 therefore shows majority-voting unit 224-1 which has seven inputs each connected to the output of stage 1 in a respective one of the seven output registers 229 . . . 240, and majority-voting unit 244-32 which likewise has seven inputs each being connected to the output of stage 32 in a respective one of the output registers 229 . . . 240. The other thirty majority-voting units are omitted from the Figure to aid clarity.

Each majority-voting unit 244 produces two outputs, a decision output on a respective line 246 which feeds one input of a 32-bit result register 248, and an error output on a respective line 250 which feeds a 32-input error adder 252. Each majority-voting unit 244 operates according to Table I below.

TABLE I

| POSSIBLE INPUT CONDITIONS | DECISION OUTPUT, LINE 246 | ERROR OUTPUT ERROR OUTPUT LINE 250 |
|---|---|---|
| 7 × 0 | 0 | 0 |
| 6 × 0<br>1 × 1 | 0 | 1 |
| 5 × 0<br>2 × 1 | 0 | 2 |
| 4 × 0<br>3 × 1 | 0 | 3 |
| 3 × 0<br>4 × 1 | 1 | 3 |
| 2 × 0<br>5 × 1 | 1 | 2 |
| 1 × 0<br>6 × 1 | 1 | 1 |
| 7 × 1 | 1 | 0 |

The first column of Table I lists the eight possible input conditions, the second column indicates the resultant decision output on the respective line 246 (produced of course by simple majority decision), and the third column shows the resultant error output on the respective error line 250 (being the number of inputs which differ from the majority decision).

The decision outputs on the line 246 are set into the respective stages of the result register 248, and these bits are fed out serially on a line 251.

The adder 252 produces an output equal to the sum of all the error inputs and this is compared in a comparator 254 with a reference on a line 256. It will be apparent that a zero output on line 253 will indicate that the 32 bits in each of the registers 229 . . . 240 are the same (and are, of course, also present in the result register 248) and therefore correspond to the original 32 bits produced by the unit 80 in the sync data formatting unit (FIG. 2). However, in order to allow latitude for reasonable transmission errors, the correlator is arranged to recognise the presence of sync data provided that the total error output on line 253 is less than a predetermined finite number, e.g. 42 (which is provided by a reference signal on line 256).

Therefore, provided that the total error signal on line 253 is less than this predetermined value, the comparator produces an output on a line 258 which is fed to an AND gate 259. The second input of gate 259 receives an input from a processing unit 260 which receives the bits on line 251 from register 248 and extracts the three control bits and the parity bit added to the original 28 bit TOD signal by unit 80 in the sync data formatting unit 50 (FIG. 2). The three control bits are output on a line 261 and used for control functions not relevant to the present description. If the parity of the received message is correct, unit 260 enables gate 259 to indicate detection of sync data, and the gate produces a sync pulse on line 64.

The remaining 28 bits from register 248 are therefore treated as the 28 bit TOD signal and are output by unit 260 on line 66.

The sync pulse output on line 64 is used to reset the divider 38B (see FIG. 1). The sync pulse will clearly not be produced until after the end of the 224-bit sync message sent in the sync hop period, allowing for the finite time necessary for carrying out the processing in the correlator, and the pre-stored 6 bits which are added to the end of the 224 bits of the sync message by means of the register 128 in the sync data formatting unit (FIG. 2) allow for this delay—so that the sync data pulse on line 64 therefore occurs exactly at the beginning of the hop period immediately following the sync hop period.

The 28 bit TOD signal on line 66 is fed to the counter 46B, see FIG. 1, and pre-sets the counter to the correct value, which is also fed to the keystream generator 20B which is therefore set into synchronism with the keystream generator 20A.

The receiver keystream generator 20B can now generate the control signal which the transmitter keystream generator 20A used to determine when in the hop frame to transmit the sync message. This signal is used to pre-set counter 42B via line 68.

The output of the demodulator 60 (see FIG. 1) is also fed to the clock recovery circuit 70 which extracts the bit timing of the 256 bits in the received signal (as in a conventional manner) and pre-sets the divider 34B.

Thus the reception of one sync message enables the receiver to become synchronised to the transmitter. The transmitter continues sending sync messages once every hop frame which help to keep the receiver synchronised. However, the receiver will stay synchronised even if it fails to detect most of these sync messages (e.g. because of transmission errors), provided reasonably accurate oscillators 30A and 30B are used.

Although the foregoing description has stated that 32 bits are added to the 224 bits produced by the registers 82 . . . 94 in the data formatting unit 50 of FIG. 2, in practice not all these bits may actually be produced and transmitted. In so far as their purpose is merely to allow for time lags in the system, they may be represented by an appropriate number of bit periods during which no actual bits are transmitted.

The foregoing description describes the normal synchrosation process which takes place during transmission. When the transmission ceases (but assuming both the transmitter and the receiver remain on), the oscillators 30A and 30B will continue to produce respective outputs. Because of inevitable drift, the time bases of the transmitter and receiver will however tend to become out of phase. When the transmitter re-commences transmission, it produces extra sync signals for a short period to enable the receiver to become re-synchronised more rapidly.

When the transmitter comes to the end of a transmission, it transmits an "end of message" signal which is recognised by the receiver via a line 270B (FIG. 1). The control unit 23B responds by holding latch 22 in the same state for the whole of each successive group of three hop periods. Therefore, the receiver is held to the same channel frequency of those three hop periods (and is then switched to a new frequency by the keystream generator 20B which is held for the next three hop periods, and so on). Additionally, the control unit 23B advances the count of divider 42B by one (by means of line 272). This means that the receiver time base is running one hop period ahead of the transmitter time base (assuming they remain in synchronisation). The receiver is now in a "waiting mode", ready for the transmitter to restart transmission.

When the transmitter starts transmitting a new message, it transmits extra sync signals for a short initial part of the message: specifically, it transmits sync signals every third hop period (that is, instead of once during each frame of 64 hop periods as is the case for normal synchronisation). This is achieved by control unit 23A which responds to the start of transmission by activating the sync data formatting unit 50 by means of line 115 (see also FIG. 2), under control of the signals on line 41, so that the transmitter transmits a sync message every third hop period.

If the transmitter and receiver time bases have not drifted apart at all since synchronisation last occurred (during the previous message), it will be apparent that each third hop period during which the transmitter transmits extra sync signals will correspond to the central one of each group of three hop periods for which the receiver holds its frequency constant (because the receiver time base has been advanced by one hop period as explained above). Assuming, therefore, that the receiver has not drifted out of step (in either direction) by more than one hop period, the correlator will be able to receive the transmitted sync messages and in this way the two time bases are brought into synchronisation by the extra sync signals.

The receiver is arranged to hold itself in the waiting mode only for a predetermined length of time, T, which is selected according to the maximum expected degree of drift of its time base oscillator in relation to the oscillator of the transmitter so as to be the maximum length of time for which the two time bases can be expected to remain within one hop period of each other under worst case conditions. If no transmissions have been received after time T, it is possible that the time bases will have drifted apart by more than one hop period and waiting mode synchronisation will not therefore enable them to re-synchronise. Control unit 23B therefore switches the receiver back into the normal mode in which it searches around the sync channels.

While the transmitter is transmitting the extra sync signals during the initial part of each message, it may also be transmitting the normal synchronisation signals, and the receiver may be arranged to respond to them also. When the predetermined initial part of each message ends, the control unit 23A automatically sets the transmitter back to transmitting only the normal synchronisation signals.

Figure 4:
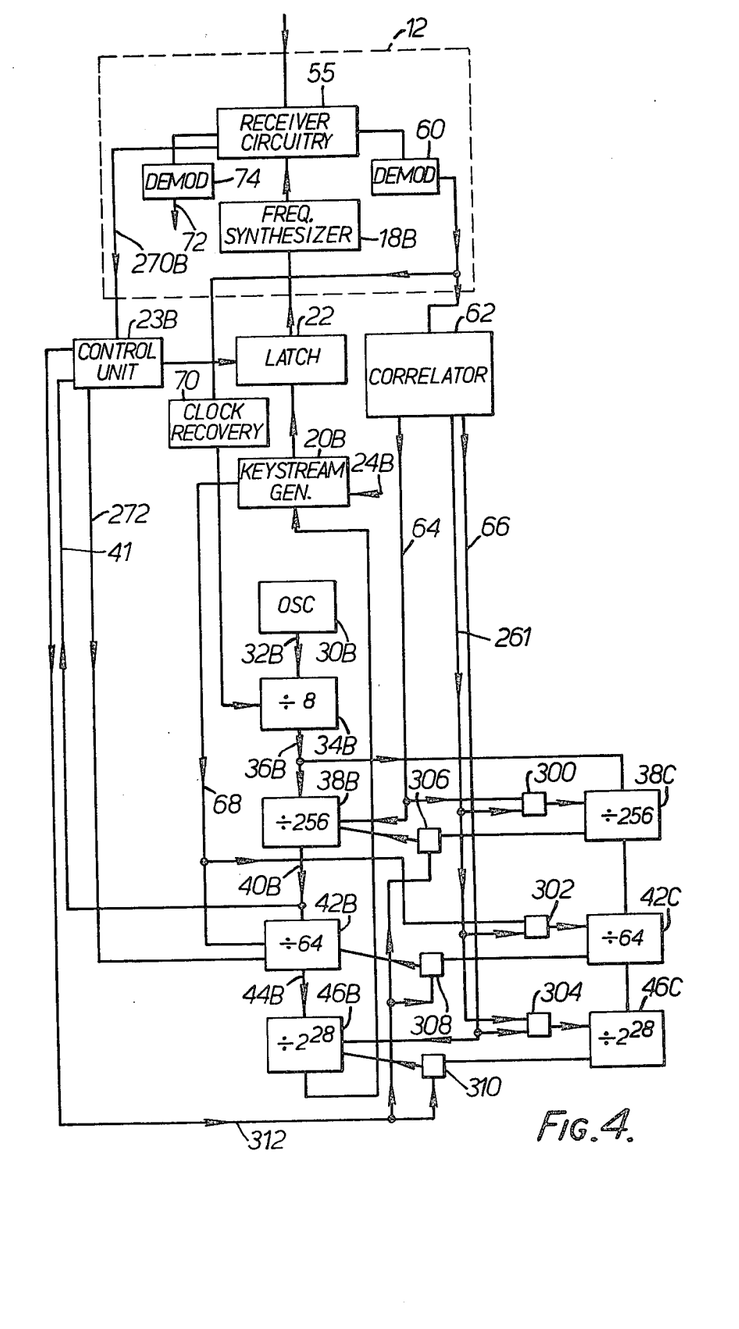
FIG. 4 is a block diagram corresponding to part of FIG. 1 and showing further features of the system.

In a network employing more than two transmitter/receiver units, it is desirable that one of them should be designated as the "master" in the sense of having primary control of the synchronisation in the network. In the system being described any one of the units can be designated the master. In addition, however, the system enables a receiver to receive a transmission from a transmitter which is not synchronised to the master. This is illustrated in FIG. 4 which illustrates the receiver of FIG. 1 and its associated timing circuit, together with additional dividers 38C, 42C and 46C corresponding to and having the same division factors as the dividers 38B, 42B and 46B respectively, and which form an auxiliary time base.

When a sync message is being sent by the transmitter which is designated as the master, this is indicated by one of the three control bits which are added in unit 80 of the sync data formatting unit 50 (see FIG. 2). As already explained, these bits are detected by the processing unit 260 in the correlator (FIG. 3) and output on line 261. Line 261 controls gates 300, 302 and 304 (see FIG. 4) and opens these gates only when the incoming sync message is detected as originating from the master.

The result is, therefore, that a sync message from a master synchronises not only the dividers of the main time base but also the dividers 38C, 42C and 46C of the auxiliary time base. The output of divider 46B controls the keystream generator in the normal way.

If, however, a sync message is received from a transmitter which is not the master, the signal on line 261 will not open gates 300, 302 and 304. Only the dividers of the main time base will be synchronised therefore (and will in turn synchronise the keystream generator so that the receiver can receive the transmission). When the transmission ends, this is detected by the control unit 23B which opens three further gates 306, 308, 310 by means of a signal on a line 312 and by means of these gates, the dividers 38B, 42B and 46B are re-set in accordance with the states of the dividers 38C, 42C and 46C. Therefore, the receiver timing is set back into synchronism with the master transmitter.

The circuits described are merely examples of the many different ways in which the principles described can be implemented.

Although the foregoing description has implied that certain equipment is present only at the transmitter and certain other equipment is present only in the receiver, in practice the transmitter would also be capable of operating as a receiver and the receiver would also be capable of operating as a transmitter, and each would therefore be similarly constructed.

The parameters used in this Specification for the frequencies, the hop rate, the length of the hop periods, hop frames, the numbers of bits in the sync message and the number of times these bits are repeated, and all other parameters are given purely by way of example and are not intended to be limiting in any way.

What is claimed is:

1. A radio transmitting and receiving system, comprising
    a radio transmitter,
    transmitter control means operative to control the transmitter so that it transmits successively at each one in a predetermined sequence of different transmitting frequencies each of which is held for a respective predetermined transmitting period,
    a radio receiver,
    receiver control means operative to control the receiver so that it receives successively at each of the frequencies in the said sequence, and
    synchronisation means operative to synchronise the transmitter control means and the receiver control means by means of the provision of timing information which tends to make the receiver frequency at any time the same as the transmitter frequency,
    the synchronisation means comprising formatting means at the transmitter for producing, and transmitting to the receiver during some, only, of the said predetermined transmitting periods, a synchronisation signal whose value represents part of the timing information and whose time of occurrence represents another part of the timing information, and sync receiving means at the receiver for extracting the value of the synchronisation signal and its time of occurrence.

2. A system according to claim 1, in which the said sequence is a pseudo-random sequence.

3. A system according to claim 1 or 2, in which the synchronisation means comprises
    a stable frequency source and a plurality of counting means connected in cascade to count the stable frequency, such that the count of one of the counting means produces the synchronisation signal and represents its said value.

4. A system according to claim 3, in which the sync receiving means includes
a like stable frequency source and a like plurality of counting means connected in cascade to count the stable frequency, and
means for setting the states of these counting means in dependence on the synchronisation signal so as to synchronise them with the counting means of the synchronisation means, the counting means of the sync receiving means controlling the receiver control means.

5. A system according to claim 4, in which the sync receiving means includes
a plurality of auxiliary counting means which are connected in cascade to count the stable frequency in parallel with the other counting means of the sync receiving means,
means responsive to a synchronisation signal received from the synchronisation means of a transmitter designated as the master to synchronise the auxiliary counting means and the said other counting means with the counting means of the synchronisation means,
means responsive to a synchronisation signal received from the synchronisation means of a transmitter not designated as the master to synchronise only the said other counting means with the counting means of the synchronisation means, and
means operative on termination of receipt of the synchronisation signals from the synchronisation means of the transmitter not designated as the master to reset the said other counting means into synchronisation with the auxiliary counting means.

6. A system according to claim 3, in which the said one counting means is downstream of another of the counting means, the count of the said other counting means changing state at regularly spaced time instants each of which defines a said time of occurrence representing a said other part of the timing information and in response to each of which the count of the said one counting means, representing the value of the synchronisation signal, changes.

7. A system according to claim 6, in which the said formatting means comprises means operative to transmit serially to the receiver the respective digits of the count value of the said counting means, the serial frequency being controlled by the said stable frequency source and the instant when the serial transmission of the digit values begins being determined by the said other counting means.

8. A system according to claim 7, in which the said digit values are transmitted a predetermined plurality of times in successive groups, but the digit values of at least some of the groups are re-arranged in each group in a respectively predetermined manner.

9. A system according to claim 8, in which the sync receiving means comprises
means operative to receive the respective successively transmitted groups of digit values,
means operative to cause the re-arranged groups to revert to their original arrangements, and
means operative to compare the resultant successive groups whereby to recognise receipt of the digit values when the successive groups are identical in values and order or do not differ from each other by more than a predetermined extent.

10. A system according to claim 7, in which the formatting means includes means for adding a predetermined group of masking digit values to the digits of the said count value and the sync receiving means includes means for subtracting the predetermined group of masking digit values.

11. A system according to claim 1, in which each synchronisation signal is transmitted at each of a plurality of predetermined frequencies in the said sequence.

12. A system according to claim 1, in which the synchronisation means includes control means operative to control the formatting means to produce, and to transmit to the receiver, respective synchronisation signals in each of particular said predetermined transmitting periods which are regularly and non-consecutively spaced apart.

13. A system according to claim 12, including means operative under control of the sync receiving means when the system is in the said alternative mode to hold the receiver frequency constant for each of the transmitting periods in successive groups thereof, each group containing the number of transmitting periods separating the starts of successive ones of the said particular transmitting periods, each group being so time-positioned and each constant frequency having such value that when the transmitter and receiver are synchronised the central transmitting period of each group is synchronised with a respective one of the said particular transmitting periods and the said constant frequency associated with that group is the frequency corresponding to that said particular transmitting period.

14. A radio transmitting and receiving network arranged to hop at a predetermined rate through frequency channels in a predetermined range of frequency channels remaining on each channel for a predetermined length of time, comprising
a plurality of radio transmitting/receiving means, each comprising frequency control means operative to control the transmitting/receiving frequency, pseudo-random sequence generating means operative to control the frequency control means to set the frequency to each one in a pseudo-random sequence of frequencies, a timing arrangement operative to control the timing of the pseudo-random sequence generating means, and synchronisating means for synchronising the timing arrangement in accordance with synchronisation data received from the other radio transmitting-/receiving means;
each timing arrangement comprising a stable frequency source and a cascaded chain of frequency counting means;
each synchronising means comprising sync transmitting means responsive to the count value of the final counting means in the chain and operative when activated by the respective pseudo-random sequence generating means to cause the digits of the count value to be transmitted by the transmitting/receiving means on some, only, of the channels in the predetermined range, each transmission being at a predetermined digital rate of transmission determined by another one of the counting means and starting and finishing at times at times determined by a further one of the counting means, and sync receiving means operative to receive the digits of the transmitted count value and to preset the final counting means in dependence on the received count value and to pre-set the other and further counting means respectively in dependence on the rate of receipt of the digits and on the time of receipt of the count value.

15. A system according to claim 14, in which the said digit values are transmitted a plurality of times in successive groups, the digit values in at least some of the groups being re-arranged in each group in a respectively different predetermined manner.

16. A system according to claim 15, in which the sync receiving means comprises
- means operative to receive the respective successively transmitted groups of digit values,
- means operative to cause the re-arranged groups to revert to their original arrangements, and
- means operative to compare the resultant succesive groups whereby to recognise receipt of the digit values when the successive groups are identical in values and order or do not differ from each other by more than a predetermined extent.

* * * * *